United States Patent
Kamioku

(10) Patent No.: US 9,375,999 B2
(45) Date of Patent: Jun. 28, 2016

(54) VEHICLE ROOF APPARATUS

(71) Applicant: AISIN SEIKI KABUSHIKI KAISHA, Kariya-shi, Aichi-ken (JP)

(72) Inventor: Naoto Kamioku, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/716,024

(22) Filed: May 19, 2015

(65) Prior Publication Data

US 2015/0336449 A1 Nov. 26, 2015

(30) Foreign Application Priority Data

May 20, 2014 (JP) ................................. 2014-104091

(51) Int. Cl.
| B60J 7/02 | (2006.01) |
| B60J 7/057 | (2006.01) |
| B60J 7/043 | (2006.01) |

(52) U.S. Cl.
CPC .. *B60J 7/02* (2013.01); *B60J 7/024* (2013.01); *B60J 7/0435* (2013.01); *B60J 7/057* (2013.01)

(58) Field of Classification Search
CPC .......... B60J 7/024; B60J 7/043; B60J 7/0435; B60J 7/047; B60J 7/05; B60J 7/053; B60J 7/057
USPC ............................................ 296/216.01–224
See application file for complete search history.

(56) References Cited

U.S. PATENT DOCUMENTS

| 4,752,099 A * | 6/1988 | Roos .......................... B60J 7/057 16/95 R |
| 4,941,706 A * | 7/1990 | Jardin ..................... B60J 7/0084 296/213 |
| 5,022,705 A * | 6/1991 | Takahashi ................ B60J 7/022 296/213 |
| 8,388,050 B2 | 3/2013 | Katsura |
| 8,398,162 B2 | 3/2013 | Katsura |
| 8,807,642 B2 * | 8/2014 | Gruss ....................... B60J 7/022 296/216.05 |
| 2005/0073177 A1 * | 4/2005 | Bendel ....................... B60J 7/02 296/216.08 |
| 2008/0191519 A1 * | 8/2008 | Sawada ...................... B60J 7/04 296/219 |
| 2009/0224573 A1 * | 9/2009 | Sawada .................... B60J 7/024 296/216.07 |
| 2012/0112496 A1 * | 5/2012 | Maruyama ............... B60J 7/022 296/216.04 |

FOREIGN PATENT DOCUMENTS

| JP | 2012-71717 | 4/2012 |
| JP | 2012-111284 | 6/2012 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A vehicle roof apparatus includes: guide rails provided on both edge portions of an opening formed on a vehicle roof, respectively; a front housing connecting front-end portions of the guide rails to each other; and a support member having a shoe portion protruding only on one side and mounted on each of the guide rails to be immovable on the one side and supporting each of the edge portions of the movable panel which opens or closes the opening, wherein the support member is rotatable about the shoe portion such that the movable panel performs a tilting up operation in a completely closed state, and wherein, in the front housing, a regulation wall is formed, which comes into contact with or approaches the support member from a side opposite to the shoe portion when the movable panel enters the completely closed state or the tilting up operation state.

7 Claims, 6 Drawing Sheets

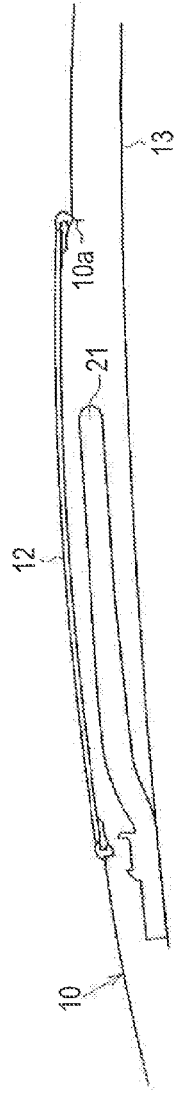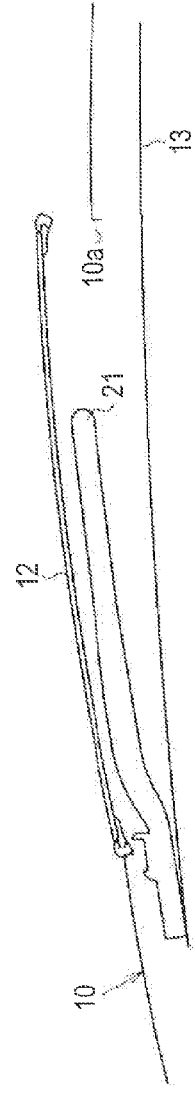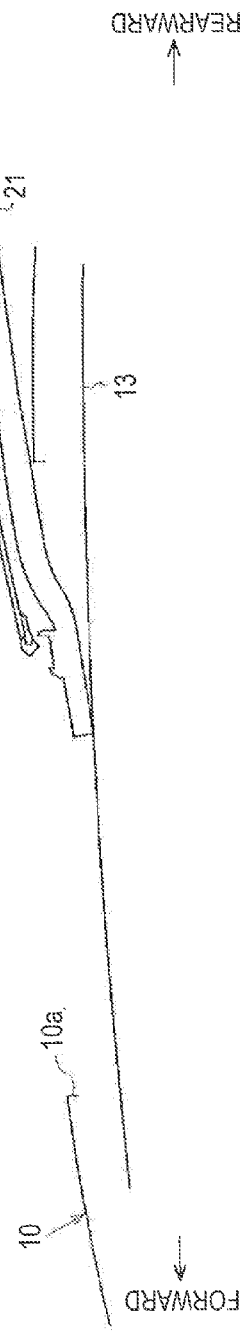

INTERIOR SIDE ← → EXTERIOR SIDE

EXTERIOR SIDE ← → INTERIOR SIDE

VEHICLE ROOF APPARATUS

CROSS REFERENCE TO RELATED APPLICATIONS

This application is based on and claims priority under 35 U.S.C. §119 to Japanese Patent Application 2014-104091, filed on May 20, 2014, the entire contents of which are incorporated herein by reference.

TECHNICAL FIELD

This disclosure relates to a vehicle roof apparatus.

BACKGROUND DISCUSSION

In the related art, various types of vehicle roof apparatuses are proposed (for example, JP 2012-71717A (Reference 1), JP 2012-111284A (Reference 2), and the like). These vehicle roof apparatuses include a support member that supports a movable panel, the support member rotates about a front portion of the movable panel in a completely closed state as a pivot point, which causes the movable panel to perform a tilting up operation, or the support member moves in a vehicle front-rear direction in a tilted up state of the movable panel, which causes the movable panel to perform an opening/closing operation.

That is, a shoe supported on a guide rail is rotatably connected to the front portion of the support member. The shoe has a pair of shoe portions disposed on both sides in a vehicle width direction such that the support member is interposed therebetween. These shoe portions are mounted on the guide rail and thereby, the support member is rotatable with respect to the guide rail and is movable along the guide rail in the vehicle front-rear direction.

In the vehicle roof apparatus, the shoe has the pair of shoe portions and thus, mounting spaces for the shoe portions need to be secured on the guide rail. Therefore, the guide rail has to be increased in size in the vehicle width direction and an opening width is decreased in the direction equivalent to the amount of an increase of the space occupied by the guide rail in the vehicle width direction.

SUMMARY

Thus, a need exists for a vehicle roof apparatus which is not suspectable to the drawback mentioned above.

A vehicle roof apparatus according to an aspect of this disclosure includes: a pair of guide rails that are provided on both edge portions of an opening formed on a vehicle roof, respectively in a vehicle width direction; a front housing that connects front-end portions of both of the guide rails to each other in the vehicle width direction, and a support member that has a shoe portion which protrudes only on one side in the vehicle width direction and which is mounted on each of the guide rails so as to be immovable on the one side in the vehicle width direction and that supports each of the edge portions of the movable panel, in the vehicle width direction, which opens or closes the opening. The support member is configured to rotate about the shoe portion such that the movable panel performs a tilting up operation in a completely closed state of the movable panel. In the front housing, a regulation wall is formed, which comes into contact with or approaches the support member from a side opposite to the shoe portion in the vehicle width direction when the movable panel enters the completely closed state or the tilting up operation state.

BRIEF DESCRIPTION OF THE DRAWINGS

The foregoing and additional features and characteristics of this disclosure will become more apparent from the following detailed description considered with the reference to the accompanying drawings, wherein:

FIGS. 3A, 3B, and 3C are views illustrating operations of the embodiment. FIG. 3A illustrates a completely closed state. FIG. 3B illustrates a tilted up state, and FIG. 3C illustrates a wide-open state;

DETAILED DESCRIPTION

First Embodiment

Hereinafter, a first embodiment of a vehicle roof apparatus will be described. From here on, a vehicle front-rear direction is referred to as the "front-rear direction" and an upper side and a lower side in the vehicle height direction are referred to as the "upper side" and the "lower side", respectively. In addition, an interior side in the vehicle width direction toward the interior of a vehicle is referred to as the "interior side" and an exterior side in the vehicle width direction toward the exterior of the vehicle is referred to as the "exterior side".

Figure 1:
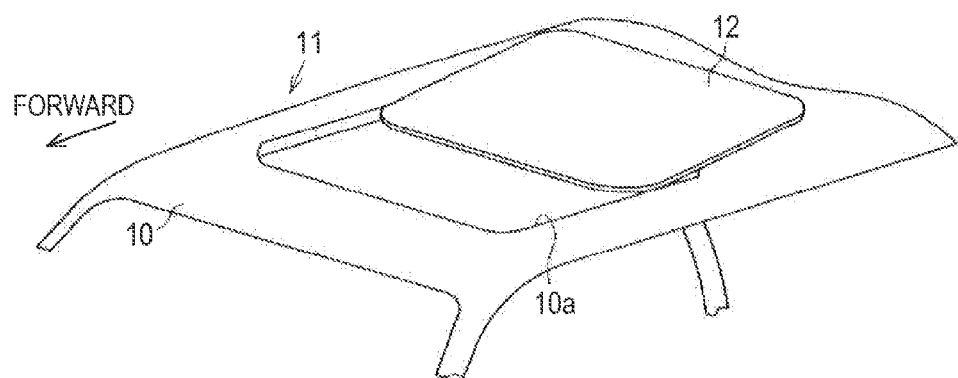
FIG. 1 is a perspective view illustrating a roof.

As illustrated in FIG. 1, a substantially quadrilateral opening 10a is formed and a sunroof apparatus 11 is mounted on a roof 10 of a vehicle such as an automobile. The sunroof apparatus 11 includes a substantially quadrilateral movable panel 12 that is formed of, for example, a glass plate, moves in the front-rear direction, and opens or closes the opening 10a.

As illustrated as a change in FIGS. 3A to 3B, the movable panel 12 is attached so as to perform a tilting up operation in which a rear-side portion thereof is lifted with a front-side portion thereof as a pivot point from a completely closed state. Or, as illustrated in change in FIGS. 3B to 3C, the movable panel 12 is attached so as to perform a sliding operation in the front-rear direction. In an opening/closing operation of the opening 10a using the movable panel 12, a so-called outer sliding method is employed, in which the sliding operation is performed in a tilted up state in which the tilting up operation is completed.

Next, a structure of the sunroof apparatus 11 related to the opening/closing operation of the movable panel 12 will be described.

Figure 2:
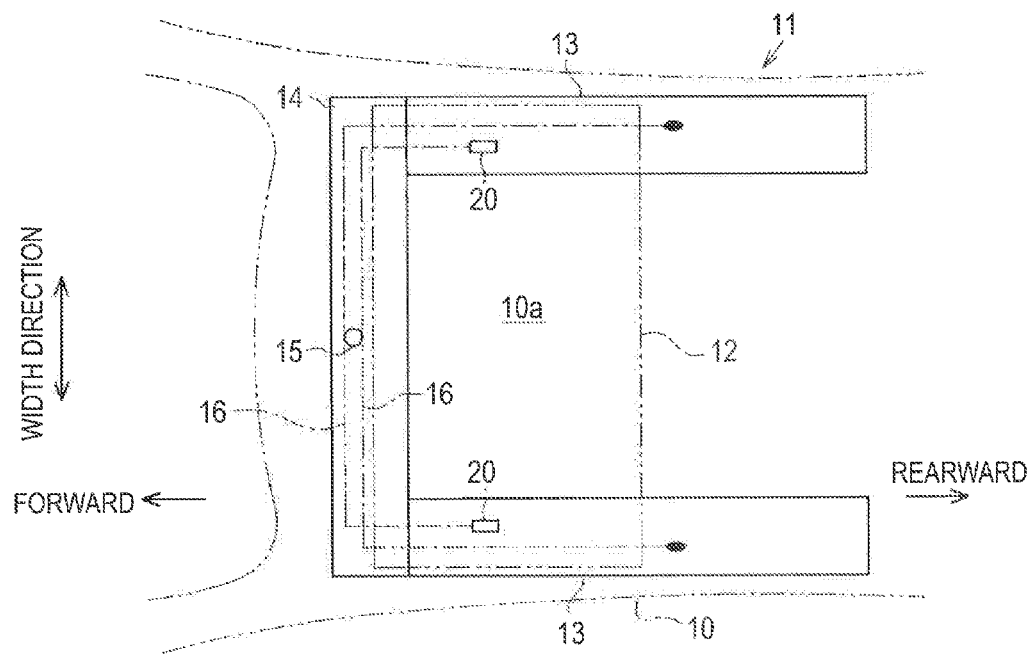
FIG. 2 is a plan view schematically illustrating a first embodiment of this disclosure.

As illustrated in FIG. 2, a pair of guide rails 13 are disposed on both edges of the opening 10a, respectively in the vehicle width direction. Each of the guide rails 13 is formed of, for example, an extruded material of an aluminum alloy, has a uniform cross section in a longitudinal direction, and extends in the front-rear direction. A functional member 20 is guided and supported on each of the guide rails 13 movably in the front-rear direction. The movable panel 12 is linked to and supported on both of the functional members 20 in a state of being mounted across the functional members 20. The movement of both of the functional members 20 along the guide rails 13 in the front-rear direction causes the movable panel 12 to perform the tilting up operation or the sliding operation (opening/closing operation).

In addition, front-end portions of both of the guide rails 13 are connected through a resin-formed front housing 14 extending in the vehicle width direction. An electric drive source 15 such as an electric motor which has an output gear, for example, is disposed at an intermediate portion of the front housing 14 in the longitudinal direction. The electric drive source 15 is connected to each of the functional members 20 through each of a pair of substantially belt-shaped drive belts 16 which is formed of a resin material, for example, and causes both of the functional members 20 to concurrently move in the front-rear direction.

Figure 4A:
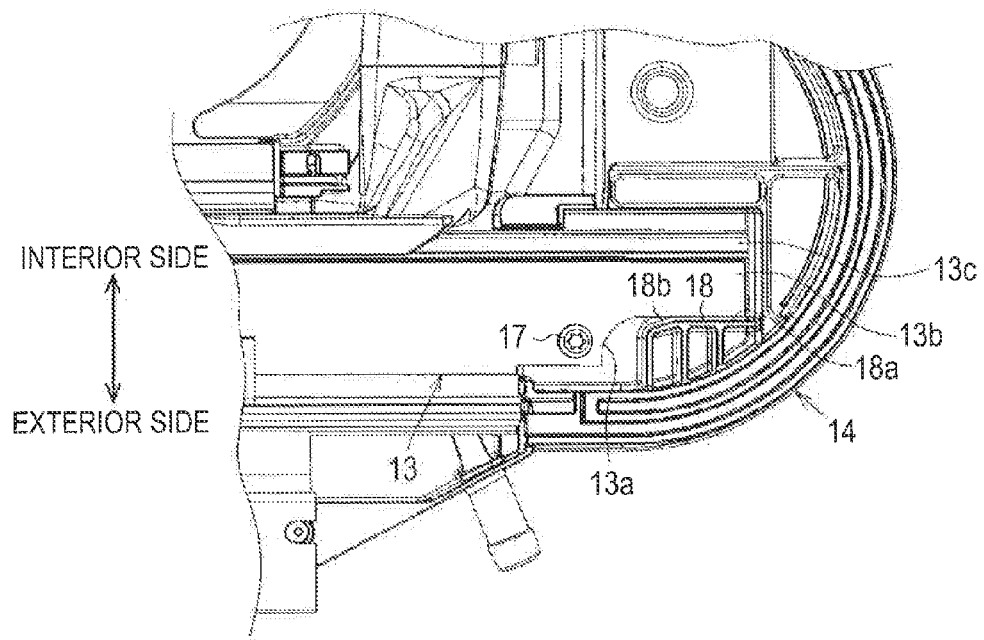
FIGS. 4A and 4B are plan views illustrating the embodiment.
Figure 4B:
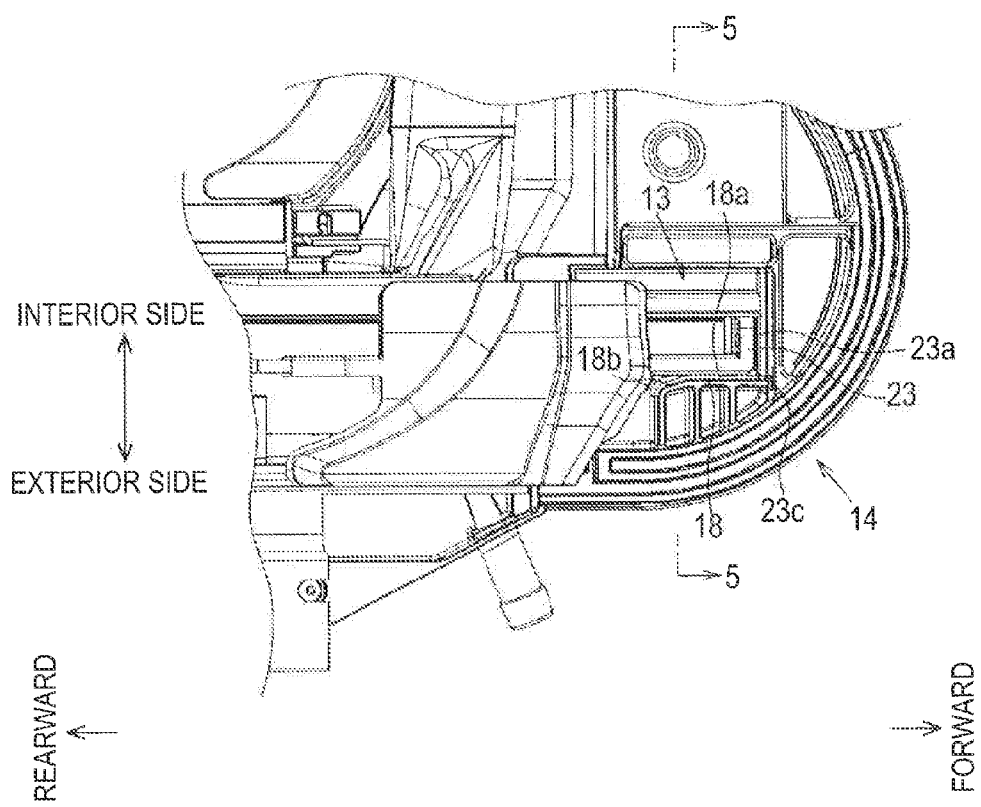
Figure 5:
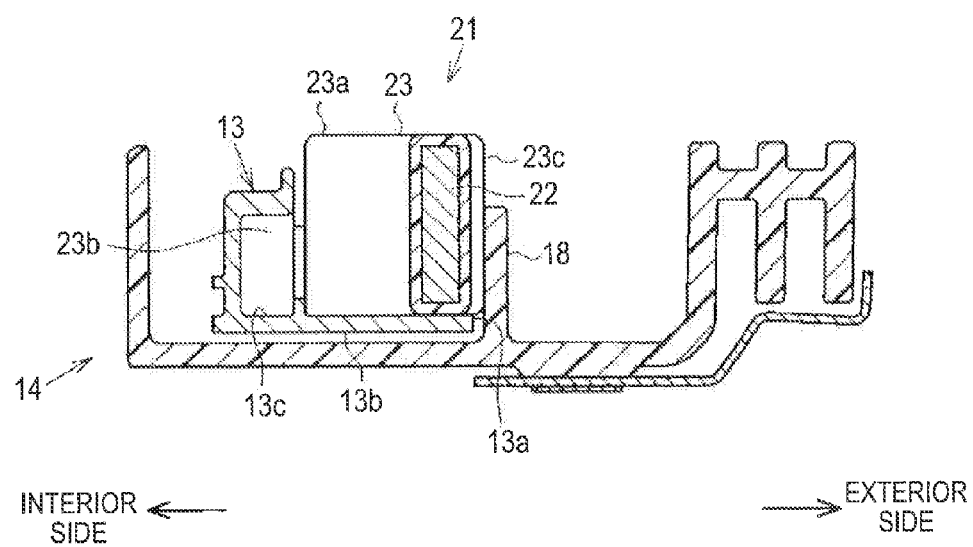
FIG. 5 is a cross-sectional view taken along line 5-5 in FIG. 4B.

As illustrated in FIGS. 4A and 4B, a notch 13a toward the interior side from the exterior side is formed on the front-end portion of each of the guide rails 13 to which the front housing 14 is connected. The notch 13a extends in a straight line basically in the longitudinal direction of the guide rail 13. In addition, as also illustrated in FIG. 5, the guide rail 13 has a substantially elongated bottom wall 13b extending in the front-rear direction (direction orthogonal to the paper surface in FIG. 5) and a guide portion 13c that has a substantially U shape in a cross section which opens on the exterior side and that is connected to an interior-side end of the bottom wall 13b. The bottom wall 13b is reduced in width in the vehicle width direction by the amount equivalent to the amount of the notch 13a on the front-end portion of the guide rail 13.

A tip-end portion of the front housing 14 in the vehicle width direction supports the front-end portion of the guide rail 13 so as to cover the front-end portion from the lower side and is fastened to the guide rail 13 on the rear side of the notch 13a using a screw 17 which penetrates through in the vehicle height direction with the guide rail 13. A regulation wall 18 is provided in the front housing 14 to be upright adjacent to the exterior side of the notch 13a. As illustrated in FIGS. 4A and 4B, an interior-side surface of the regulation wall 18 has a regulation surface 18a extending in a straight line shape in the longitudinal direction of the guide rail 13 in a plan view and a guide surface 18b which is connected on a rear end of the regulation surface 18a and is inclined at an angle toward the exterior side as much as the regulation surface is inclined toward the rear side, As illustrated in FIGS. 3A to 3C, a support bracket 21 as a support member is fixed to a lower portion of each of the edges of the movable panel 12 in the vehicle width direction. The support bracket 21 extends in the front-rear direction substantially across the entire length of the movable panel 12 and is connected to the functional member 20. That is, the movable panel 12 is supported on the functional member 20 via the support bracket 21.

Figure 6:
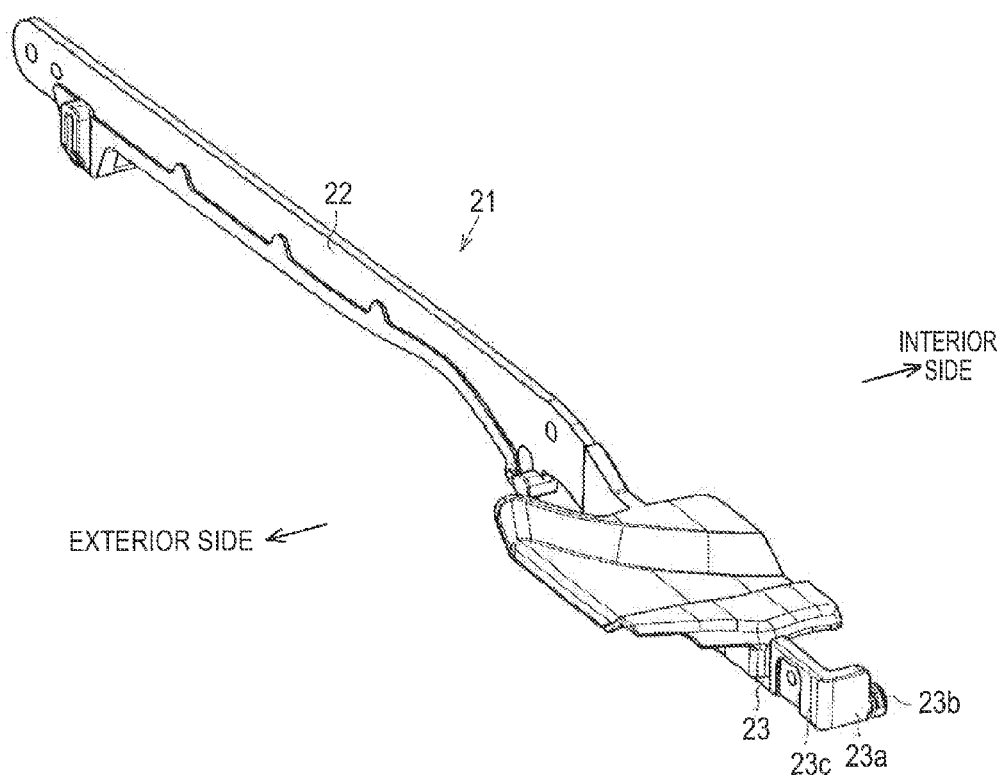
FIG. 6 is a perspective view illustrating a support bracket.

As also illustrated in FIG. 6, the support bracket 21 has a vertical wall section 22 formed of a metal plate which is vertically provided under the lower surface of the movable panel 12 and has a resin-formed section 23 in which the front-end portion of the vertical wall section 22 is mainly buried. The formed section 23 has a substantially quadrilateral plate-like extending piece 23a which extends toward the interior side from the front end and has a substantially cylindrical shoe portion 23b which protrudes toward the interior side from a lower portion of the tip of the extending piece 23a. The center line of the shoe portion 23b extends in the vehicle width direction. In addition, the formed section 23 has a substantially rib-like protrusion 23c which protrudes toward the exterior side (side opposite to the shoe portion 23b in the vehicle width direction) from the front end. The protrusion 23c extends in the vehicle width direction and a direction orthogonal to the longitudinal direction of the guide rail 13.

As illustrated in FIGS. 3A to 3C, normally, since the guide rail 13 is gently curved in accordance with the design of the roof 10, the guide rail 13 is slightly shifted in the longitudinal direction with respect to the straight front-rear direction. The longitudinal direction of the guide rail 13 which defines the extending direction of the protrusion 23c means a tangential direction of the curve of the guide rail 13 at a position of the protrusion 23c. It is taken for granted that the extending direction of the protrusion 23c substantially matches the vehicle height direction.

As illustrated in FIG. 5, the support bracket 21 has the vertical wall section 22 including the extending piece 23a of the formed section 23 which is disposed on the bottom wall 13b of the guide rail 13 and the shoe portion 23b is mounted so as to be rotatable with respect to the guide portion 13c and to be slidable in the front-rear direction. It is taken for granted that the shoe portion 23b is immovable toward the interior side (one side in the vehicle width direction) with respect to the guide rail 13. The support bracket 21 rotates about the shoe portion 23b in response to the movement of the functional member 20 along the guide rail 13 in the front-rear direction and thereby, the rear-side portion of the movable panel 12 is caused to be lifted with the front-side portion (shoe portion 23b) as a pivot point such that the tilting up operation is performed and the rear-side portion is caused to be lowered with the front-side portion as a pivot point such that a tilting down operation is performed (refer to FIGS. 3A and 3B), The shoe portion 23b is caused to slide on the guide portion 13c and the support bracket 21 moves in the front-rear direction in response to the movement of the functional member 20 along the guide rail 13 in the front-rear direction and thereby, the movable panel 12 performs the sliding operation (opening/closing operation) (refer to FIGS. 3B and 3C).

In the completely closed state of the movable panel 12, the regulation wall 18 is disposed adjacent to the exterior side of the vertical wall section 22 and the protrusion 23c comes into contact with or approaches the regulation wall 18. To be more exact, as illustrated in FIG. 4B, in the completely closed state of the movable panel 12, the protrusion 23c comes into contact with or approaches the regulation surface 18a of the regulation wall 18. It is taken for granted that the regulation wall 18 which is brought into contact with or is approached by the protrusion 23c enters the notch 138, The same is true of the tilting up operation (or tilting down operation) state of the movable panel 12 which does not substantially follow the movement of the support bracket 21. That is, during the closing operation of the movable panel 12, the protrusion 23c passes the position of the guide surface 18b of the regulation wall 18 and enters the position of the regulation surface 18a. At this time, the regulation wall 18 has the guide surface 18b which causes a gap between the regulation wall and the support bracket 21 in the vehicle width direction to become gradually reduced.

Next, effects of this embodiment will be described.

The shoe portion 23b mounted on each of both of the guide rails 13 protrudes only on one side of the support bracket 21 in the vehicle width direction and thereby, a mounting space for the shoe portion 23b on the guide rail 13 is reduced.

As described above, this embodiment achieves the following effects.

(1) In this embodiment, the mounting space for the shoe portion 23b on the guide rail 13 is reduced. Therefore, the guide rail 13 can be decreased in size in the vehicle width direction and an opening width (pitch between the rails) of the opening 10a can be increased in the direction by the amount equivalent to the amount of the decrease of the space occupied by the guide rails 13 in the vehicle width direction.

In particular, the shoe portion 23b is mounted on the guide rail 13 so as to be immovable on the interior side (the one side in the vehicle width direction) and the support bracket 21 comes into contact with or approaches the regulation wall 18 on the exterior side (side opposite to the shoe portion 23b in the vehicle width direction). Hence, when the movable panel 12 enters the completely closed state or the tilting up operation state, it is possible to suppress twisting of the support bracket 21 in the vehicle width direction. Then, when the movable panel 12 enters the completely closed state or the tilting up operation state, it is possible to suppress rattling of the movable panel 12.

(2) In this embodiment, even when the support bracket 21 comes into contact with the regulation wall 18 in the opening/closing operation state in which the movable panel 12 opens or closes the opening 10a, the protrusion 23c enables the support bracket 21 to come into line contact with the regulation wall 18 and it is possible to suppress an increase in sliding resistance.

(3) In this embodiment, even when the support bracket 21 comes into contact with the regulation wall 18 during the closing operation of the movable panel 12, the guide surface 18b brings about a gradual increase of the sliding resistance between the support bracket and the regulation wall and it is possible to further stabilize the closing operation of the movable panel 12.

(4) In this embodiment, the shoe portion 23b is formed integrally with the support bracket 21 and thus, it is possible to prevent the number of components from being increased.

(5) In this embodiment, the regulation wall 18 is formed integrally with the front housing 14 and thus, it is possible to prevent the number of components from being increased.

Second Embodiment

Hereinafter, a second embodiment of the vehicle roof apparatus will be described. For the sake of convenience of the description, the same reference signs are attached to the same configuration as in the first embodiment described above and a part of the description thereof is omitted.

Figure 7:
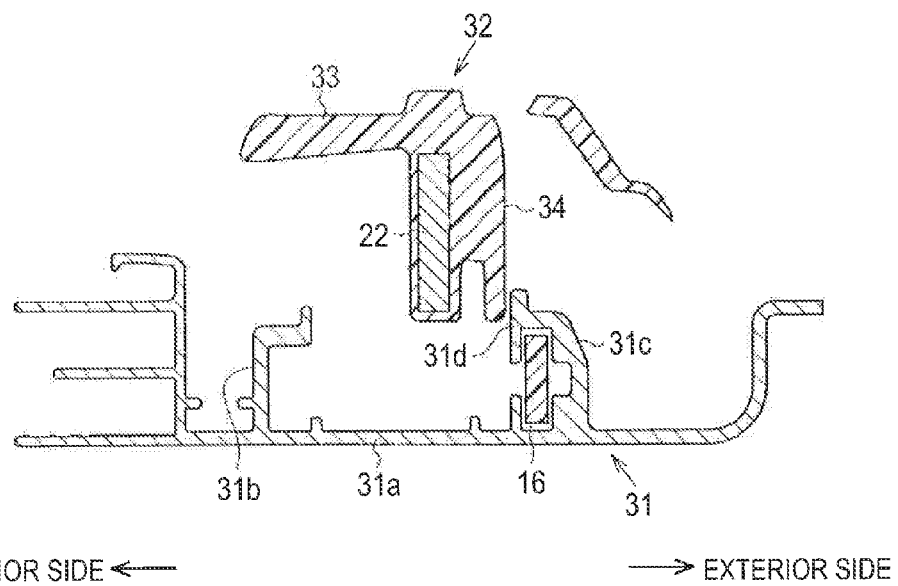
FIG. 7 is a transverse cross-sectional view illustrating a second embodiment of this disclosure.

As illustrated in FIG. 7, a guide rail 31 of this embodiment is formed of, for example, an extruded material of an aluminum alloy, has a uniform cross section in the longitudinal direction, and extends in the front-rear direction (direction orthogonal to the paper surface in FIG. 7). The guide rail 31 has a substantially elongated bottom wall 31a extending in the front-rear direction, a guide portion 31b that has a substantially U shape in a cross section which opens on the exterior side and that is connected to an interior-side end of the bottom wall 31a, and a belt guide portion 31c that has a substantially cross shape in a cross section which opens on the interior side and that is connected to an exterior-side end of the bottom wall 31a. An interior-side surface of the upper end portion of the belt guide portion 31c extends in a substantially straight line in the vehicle height direction and forms a rail-side regulation surface 31d. The belt guide portion 31c guides the movement of the drive belt 16.

Figure 8:
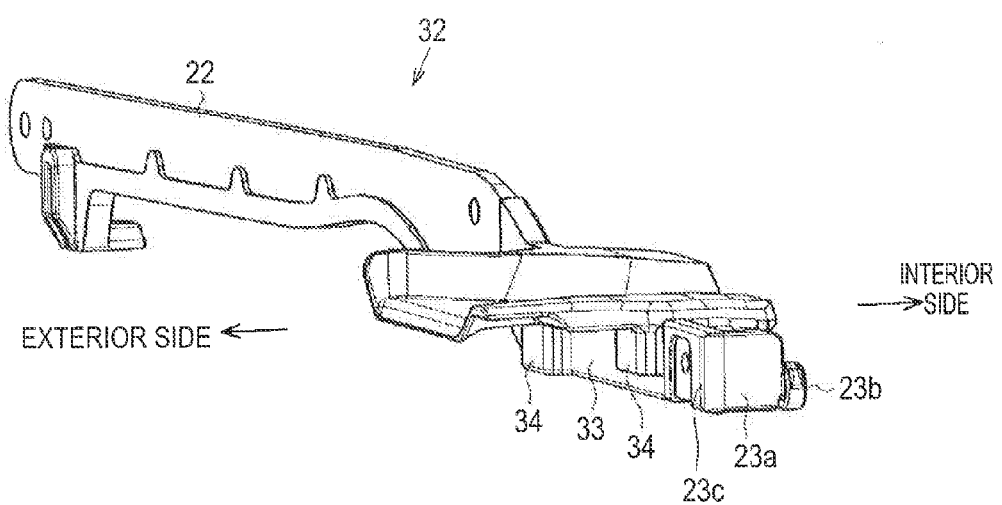
FIG. 8 is a perspective view illustrating a support bracket.

As also illustrated in FIG. 8, a support bracket 32 based on the support bracket 21 has a resin-formed section 33 in which the front-end portion of the vertical wall section 22 is mainly buried The formed section 33 has a pair of substantially square column-like protruding portions 34 which protrude toward the exterior side (side opposite to the shoe portion 23b in the vehicle width direction) on the rear side of the extending piece 23a. Both of the protruding portions 34 are disposed to be spaced from each other in the front-rear direction and are disposed at the same position in the vehicle height direction in the tilted up state of the movable panel 12.

As illustrated in FIG. 7, the support bracket 32 has the vertical wall section 22 including a part of the formed section 33 which is disposed on the upper side of the bottom wall 31a of the guide rail 31, for example, in the completely closed state of the movable panel 12. At this time, both of the protruding portions 34 come into contact with or approach the rail-side regulation surface 31d of the belt guide portion 31c on the exterior side (side opposite to the shoe portion 23b in the vehicle width direction). Hence, the movement above both of the protruding portions 34 is not regulated by the guide rail 31. It is taken for granted that the shoe portion 23b is mounted to be rotatable with respect to the guide portion 31b based on the guide portion 13c and to be slidable in the front-rear direction. The same is true of any opening state in which the movable panel 12 is in the tilted up state.

As described above, according to this embodiment, the following effects are achieved in addition to the effects of the first embodiment.

(1) In this embodiment, when the movable panel 12 enters the tilted up state, the shoe portion 23b of the support bracket 32 is mounted on the guide rail 31 so as to be immovable on the interior side (one side in the vehicle width direction) and the protruding portions 34 come into contact with or approach the rail-side regulation surface 31d (guide rail 31) on the exterior side (side opposite to the shoe portion 23b in the vehicle width direction), Hence, when the movable panel 12 enters the tilted up state, that is, when the movable panel 12 enters the opening state (for example, wide-open state) or the opening/closing operation state, it is possible to suppress twisting of the support bracket 32 in the vehicle width direction.

(2) In this embodiment, a plurality of the protruding portions 34 are provided and thereby, it is possible for at least one protruding portion 34 to more reliably come into contact with or approach the rail-side regulation surface 31d (guide rail 31) even when a posture of the support bracket 32 is changed.

The embodiment described above may be changed as follows.

According to the first embodiment, a so-called inner sliding method may be employed as the opening/closing operation of the opening 10a using the movable panel 12.

According to the second embodiment, one protruding portion 34 or three or more protruding portions 34 may be provided.

According to the second embodiment, the shoe portion 23b and the protruding portions 34 may be disposed on the interior side and on the exterior side, respectively, such that the vertical wall section 22 is interposed therebetween; however the relationship therebetween may be reversed. That is, the shoe portion 23b and the protruding portions 34 may be disposed on the exterior side and on the interior side, respectively such that the vertical wall section 22 is interposed therebetween.

According to the embodiments described above, the shoe portion may be separate from the support bracket 21 or 32. In this case, the shoe portion may be connected to the support bracket 21 or 32 so as not to be rotatable or may be connected to the support bracket 21 or 32 so as to be rotatable. In the case where the shoe portion is connected to the support bracket 21 or 32 so as to be rotatable, the support bracket 21 or 32 rotates with respect to the shoe portion at the time of the tilting up operation or the tilting down operation of the movable panel 12.

According to the embodiments described above, the guide surface 18b of the regulation wall 18 may be omitted.

According to the embodiments described above, there is no limitation on the extending direction of the protrusion 23c of the formed section 23 or 33 as long as the extending direction is a direction orthogonal to the longitudinal direction of the guide rail 13 on a surface formed in the vehicle height direction and the longitudinal direction of the guide rail 13. In addition, the protrusion 23c may extend in a curved line.

According to the embodiments described above, the protrusion 23c of the formed section 23 or 33 may be omitted.

According to the embodiments described above, the shoe portion 23b and the protrusion 23c are disposed on the interior side and on the exterior side, respectively, such that the vertical wall section 22 is interposed therebetween; however the relationship therebetween may be reversed. That is, the shoe portion 23b and the protrusion 23c may be disposed on the exterior side and on the interior side, respectively such that the vertical wall section 22 is interposed therebetween.

According to the embodiments described above, the functional member 20 may move forward, which causes the movable panel 12 to perform the tilting up operation in the completely closed state of the movable panel 12 and the functional member 20 may move rearward, which causes the movable panel 12 to perform the sliding operation in the tilted up state. Or, the functional member 20 may move rearward, which causes the movable panel 12 to perform the tilting up operation in the completely closed state of the movable panel 12 and the functional member 20 may move rearward again, which causes the movable panel 12 to perform the sliding operation in the tilted up state.

Next, technical ideas comprehensible from the embodiments and the other examples described above will be additionally described, hereinafter.

(A) According to the vehicle roof apparatus described above, the shoe portion is formed integrally with the support member.

In this configuration, it is possible to prevent the number of components from being increased.

A vehicle roof apparatus according to an aspect of this disclosure includes: a pair of guide rails that are provided on both edge portions of an opening formed on a vehicle roof, respectively in a vehicle width direction; a front housing that connects front-end portions of both of the guide rails to each other in the vehicle width direction; and a support member that has a shoe portion which protrudes only on one side in the vehicle width direction and which is mounted on each of the guide rails so as to be immovable on the one side in the vehicle width direction and that supports each of the edge portions of the movable panel, in the vehicle width direction, which opens or closes the opening. The support member is configured to rotate about the shoe portion such that the movable panel performs a tilting up operation in a completely closed state of the movable panel. In the front housing, a regulation wall is formed, which comes into contact with or approaches the support member from a side opposite to the shoe portion in the vehicle width direction when the movable panel enters the completely closed state or the tilting up operation state.

In this configuration, the shoe portions which are mounted on both of the guide rails, respectively, protrude only on one side of the support member in the vehicle width direction and thereby, it is possible to reduce a mounting space for the shoe portion which is provided in the guide rail. Therefore, the guide rail can be decreased in size in the vehicle width direction and an opening width of the opening can be increased in the direction by the amount equivalent to the amount of decrease of the space occupied by the guide rails in the vehicle width direction.

In particular, the shoe portion is mounted on the guide rail so as to be immovable on the one side in the vehicle width direction and the support member comes into contact with or approaches the regulation wall in the vehicle width direction on the side opposite to the shoe portion. Hence, when the movable panel enters the completely closed state or the tilting up operation state, it is possible to suppress twisting of the support member in the vehicle width direction.

In the vehicle roof apparatus, it is preferable that the support member has a protrusion that protrudes toward the side opposite to the shoe portion in the vehicle width direction and extends in the vehicle width direction and a direction orthogonal to a longitudinal direction of the guide rail and that the regulation wall comes into contact with or approaches the protrusion in the completely closed state or the tilting up operation state of the movable panel.

In this configuration, even when the support member comes into contact with the regulation wall in the opening/closing operation state in which the movable panel opens or closes the opening, the protrusion enables the support member to come into line contact with the regulation wall and it is possible to suppress increase of sliding resistance.

In the vehicle roof apparatus, it is preferable that the regulation wall has a guide surface which causes a gap between the regulation wall and the support member in the vehicle width direction to become gradually reduced in response to a closing operation in which the movable panel closes the opening.

In this configuration, even when the support member comes into contact with the regulation wall in the closing operation of the movable panel, the guide surface brings about a gradual increase of the sliding resistance between the support member and the regulation wall and it is possible to further stabilize the closing operation of the movable panel.

In the vehicle roof apparatus, it is preferable that the support member is configured to move in a vehicle front-rear direction such that the movable panel is caused to perform an opening/closing operation in a tilted up state in which the tilting up operation of the movable panel is completed and that, in the support member, a protruding portion is formed, which comes into contact with or approaches the guide rail from the side opposite to the shoe portion in the vehicle width direction when the movable panel enters the tilted up state.

In this configuration, when the movable panel enters the tilted up state, the shoe portion is mounted on the guide rail so as to be immovable on the one side in the vehicle width direction and the protruding portion of the support member comes into contact with or approaches the guide rail in the vehicle width direction on the side opposite to the shoe portion. Hence, when the movable panel enters the tilted up state, that is, when the movable panel enters the opening state or the opening/closing operation state, it is possible to suppress twisting of the support member in the vehicle width direction.

In the vehicle roof apparatus, it is preferable that a plurality of the protruding portions are provided.

In this configuration, the plurality of protruding portions are provided and thereby, it is possible for at least one of the protruding portions to more reliably come into contact with or approach the guide rail even when the posture of the support member is changed.

The aspect of this disclosure achieves an effect that an opening width in the vehicle width direction can be prevented from being decreased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle roof apparatus comprising:
   a pair of guide rails that are provided on both edge portions of an opening formed on a vehicle roof, respectively in a vehicle width direction;
   a front housing that connects front-end portions of both of the guide rails to each other in the vehicle width direction; and
   a support member that has a shoe portion which protrudes only on one side in the vehicle width direction and which is mounted on each of the guide rails so as to be immovable on the one side in the vehicle width direction and that supports each of the edge portions of a movable panel in the vehicle width direction, wherein the movable panel opens or closes the opening,
   wherein the support member is configured to rotate about the shoe portion such that the movable panel performs a tilting up operation in a completely closed state of the movable panel,
   wherein, in the front housing, a regulation wall is formed, which comes into contact with or approaches the support member from a side opposite to the shoe portion in the vehicle width direction when the movable panel enters the completely closed state or the tilting up operation state; and
   wherein the regulation wall has a guide surface which causes a gap between the regulation wall and the support member in the vehicle width direction to become gradually reduced in response to a closing operation in which the movable panel closes the opening.

2. The vehicle roof apparatus according to claim 1, wherein the support member has a protrusion that protrudes toward the side opposite to the shoe portion in the vehicle width direction and extends in the vehicle width direction and a direction orthogonal to a longitudinal direction of the guide rail, and
   wherein the regulation wall comes into contact with or approaches the protrusion in the completely closed state or the tilting up operation state of the movable panel.

3. The vehicle roof apparatus according to claim 1, wherein the support member is configured to move in a vehicle front-rear direction such that the movable panel is caused to perform an opening/closing operation in a tilted up state in which the tilting up operation of the movable panel is completed, and
   wherein, in the support member, a protruding portion is formed, which comes into contact with or approaches the guide rail from the side opposite to the shoe portion in the vehicle width direction when the movable panel enters the tilted up state.

4. The vehicle roof apparatus according to claim 2, wherein the support member is configured to move in a vehicle front-rear direction such that the movable panel is caused to perform an opening/closing operation in a tilted up state in which the tilting up operation of the movable panel is completed, and
   wherein, in the support member, a protruding portion is formed, which comes into contact with or approaches the guide rail from the side opposite to the shoe portion in the vehicle width direction when the movable panel enters the tilted up state.

5. The vehicle roof apparatus according to claim 3, wherein a plurality of the protruding portions are provided.

6. The vehicle roof apparatus according to claim 4, wherein a plurality of the protruding portions are provided.

7. The vehicle roof apparatus according to claim 1, wherein the shoe portion is formed integrally with the support member.

* * * * *